(12) United States Patent
Stamoulis et al.

(10) Patent No.: US 7,852,801 B2
(45) Date of Patent: Dec. 14, 2010

(54) REDUCING COLLISION PROBABILITY FOR VOIP PACKETS

(75) Inventors: Anastasios Stamoulis, San Diego, CA (US); Nikhil Jain, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 280 days.

(21) Appl. No.: 11/238,812

(22) Filed: Sep. 28, 2005

(65) Prior Publication Data

US 2007/0070936 A1  Mar. 29, 2007

(51) Int. Cl.
*H04W 4/00* (2009.01)
(52) U.S. Cl. .............. 370/328; 370/321; 370/337; 370/338; 370/347; 370/401; 455/41.2; 455/574
(58) Field of Classification Search ............ 370/335, 370/336, 337, 338, 352, 466, 347, 321, 280, 370/328–329; 455/450–452.2, 41.2, 574
See application file for complete search history.

(56) References Cited

U.S. PATENT DOCUMENTS

| | | | | |
|---|---|---|---|---|
| 5,428,603 A * | 6/1995 | Kivett | .................. | 370/280 |
| 5,457,680 A * | 10/1995 | Kamm et al. | ............... | 370/332 |
| 5,509,015 A * | 4/1996 | Tiedemann et al. | ......... | 370/311 |
| 5,677,909 A * | 10/1997 | Heide | ......................... | 370/347 |
| 5,790,536 A * | 8/1998 | Mahany et al. | ............... | 370/338 |
| 5,940,771 A * | 8/1999 | Gollnick et al. | ............. | 455/517 |
| 6,539,003 B1 * | 3/2003 | Agarwal et al. | ............. | 370/324 |
| 6,895,248 B1 * | 5/2005 | Akyol et al. | ............. | 455/452.1 |
| 7,110,349 B2 * | 9/2006 | Branlund et al. | ............ | 370/203 |
| 7,433,683 B2 * | 10/2008 | Dharia et al. | ............ | 455/422.1 |
| 2003/0008640 A1 * | 1/2003 | Lansio et al. | ............... | 455/414 |
| 2003/0016770 A1 * | 1/2003 | Trans et al. | .................. | 375/346 |
| 2004/0001477 A1 * | 1/2004 | D'Amico et al. | ............ | 370/352 |
| 2004/0165562 A1 * | 8/2004 | Elaoud et al. | ............... | 370/338 |
| 2004/0223466 A1 * | 11/2004 | Schrader et al. | ............. | 370/321 |
| 2004/0246990 A1 * | 12/2004 | Krishnamurthi et al. | .... | 370/466 |
| 2005/0058137 A1 * | 3/2005 | Carlson et al. | ........... | 370/395.4 |
| 2006/0142011 A1 * | 6/2006 | Kallio | ........................ | 455/445 |
| 2010/0008254 A1 * | 1/2010 | Schneyer et al. | ............ | 370/254 |

FOREIGN PATENT DOCUMENTS

WO   WO2005064955 A1   7/2005

OTHER PUBLICATIONS

International Search Report and Written Opinion—PCT/US2006/038538, International Search Authority—European Patent Office—Jul. 2, 2007.

(Continued)

*Primary Examiner*—Sharad Rampuria
(74) *Attorney, Agent, or Firm*—Abdollah Katbab (57) ABSTRACT

A mobile communications device is described that includes a processor configured to establish a network connection with a server in a network and a data generator under the control of the processor that is configured to periodically generate a data unit at a rate having a fixed period. The mobile communications device also includes a transceiver configured to transmit, via the network connection, the data unit during one of the plurality of slots, each slot being an adjacent fractional portion of the fixed period.

20 Claims, 4 Drawing Sheets

OTHER PUBLICATIONS

Kawata T. et al: "Using dynamic PCF to improve the capacity for VoIP traffic in IEEE 802.11 networks" Wireless Communications and Networking Conference, 2005 IEEE New Orleans, LA. USA Mar. 13-17, 2005, Piscataway, NJ, USA,IEEE, Mar. 13, 2005, pp. 1589-1595, XP010791413 ISBN: 0-7803-8966-2 the whole document.

Dongyan Chen, Aschin Garg, Martin Kappes, and Kishor S. Trivedi: "Supporting VBR VoIP Traffic in IEEE 802.11 WLAN in PCF Mode" [online] Jul. 2002, pp. 1-6, XP002417086 Center for Advanced Computing and Communications, ECE Department, Duke University, Durham, NC 27705 Retrieved from the Internet.

* cited by examiner

REDUCING COLLISION PROBABILITY FOR VOIP PACKETS

BACKGROUND

1. Field

The present disclosure relates generally to telecommunications, and more particularly, to systems and methods for controlling and managing access to a wireless network.

2. Background

The demand for wireless information services has led to the development of an ever increasing number of wireless networks. CDMA2000 1x is just one example of a wireless network that provides wide area telephony and data services. CDMA2000 1x is a wireless standard promulgated by the Third Generation Partnership Project 2 (3GPP2) using code division multiple access (CDMA) technology. CDMA is a technology that allows multiple users to share a common communications medium using spread-spectrum processing. A competing wireless network that is commonly employed in Europe is Global System for Mobile Communications (GSM). Unlike CDMA2000 1x, GSM uses narrowband time division multiple access (TDMA) to support wireless telephony and data services. Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as wide area networks employing cellular technology. Cellular technology is based on a topology in which the geographic coverage region is broken up into cells. Within each of these cells is a fixed base transceiver station (BTS) that communicates with mobile users. A base station controller (BSC) is typically employed in the geographic coverage region to control the BTSs and route communications to the appropriate gateways for the various packet-switched and circuit-switched networks.

As the demand for wireless information services continue to increase, mobile devices are evolving to support integrated voice, data, and streaming media while providing seamless network coverage between wide area cellular networks and wireless local area networks (LAN). Wireless LANs generally provide telephony and data services over relatively small geographic regions using a standard protocol, such as IEEE 802.11, Bluetooth, or the like. The existence of wireless LANs provides a unique opportunity to increase user capacity in a wide area cellular network by extending cellular communications to the unlicensed spectrum using the infrastructure of the wireless LAN.

However, unlike cellular services, many wireless LAN technologies allow all potential transmitting devices random access to the broadcast medium without guaranteeing particular Quality of Service (QoS) levels. Thus, for certain applications such as Voice over IP (VoIP), delays may be introduced between communicating users that are, at the least, minor annoyances and, at the worst, unacceptable from the user's viewpoint. Because many such wireless LANs also employ random back-off algorithms to avoid subsequent contention between the users, these delays (and therefore performance) only worsen as more VoIP users associate with a particular wireless LAN.

Some techniques for addressing this problem have been developed in the past with respect to 802.11 wireless LANs. These techniques have typically included assigning a priority to VoIP traffic and then handling that traffic outside of the implemented standard using tactics such as modifying the contention window, modifying the interframe spacing, jamming or overriding other traffic; not requiring an acknowledgement (ACK), using a zero-back-off setting, and transmitting VoIP packets ahead of any data packets waiting in the transmission queue.

Regardless of the merits of any of these techniques, continued improvement in the QoS of VOIP applications within a wireless LAN remains desirable and it is preferable that such improvement be accomplished without deviating from already established communications standards such as, for example, 802.11.

SUMMARY

One aspect of a mobile communications device is disclosed that relates to a processor configured to establish a connection with a server in a random access network and a data generator under the control of the processor that is configured to periodically generate a data unit at a rate having a fixed period. The mobile communications device also includes a transceiver configured to transmit to the server the data unit during a particular transmission slot in each of the fixed periods.

Another aspect of a mobile communications device is described that relates to a processor configured to establish a network connection over a random access network and a vocoder controlled by the processor that is configured to generate a voice packet at a rate having a fixed period. Furthermore, the processor configured to buffer the voice packet until a transmit time. This mobile communications device further includes a transceiver, in communications with the buffer, that is configured to transmit the voice packet at the transmit time corresponding to a particular time slot in each of the fixed periods.

Yet another aspect of a mobile communications device is described that relates to a processor configured to identify a particular transmission slot in a transmission period. The processor is further configured to establish a network connection with a server over a random access network, and periodically generate a data unit at a period substantially equal to the transmission period. In accordance with this aspect of the device a transceiver is configured to transmit, to the server, the data unit during the particular transmission slot.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

In the following detailed description, techniques will be described for selecting a network in a multiple network environment. A number of techniques will be described in the context of a mobile communications device traveling through a wide area cellular network with one or more wireless LANs dispersed throughout the cellular coverage region. The mobile communications device may be any suitable device capable of wireless telephony or data communications, such as a cellular phone designed for operation in a CDMA2000 1x network. The mobile communications device may be capable of employing any suitable protocol for accessing a wireless LAN, including, by way of example, IEEE 802.11. While these techniques may be described in the context of a cellular phone capable of communicating with an IEEE 802.11 network, those skilled in the art will readily appreciate that these techniques can be extended to other mobile communication devices capable of accessing multiple networks. For instance, these techniques may be applied to a mobile communications device capable of switching between a CDMA2000 1x network and a GSM network. Alternatively, these techniques may be applied to a mobile communications device capable of accessing a single network, such as a IEEE 802.11 phone. The IEEE 802.11 phone may be configured to connect to the wireless LAN only if certain parameters indicate that the service quality is acceptable. Accordingly, any reference to a cellular phone capable of communicating with an IEEE 802.11 network, or any other specific embodiment, is intended only to illustrate various aspects of the present invention, with the understanding that these aspects have a wide range of applications.

Figure 1:
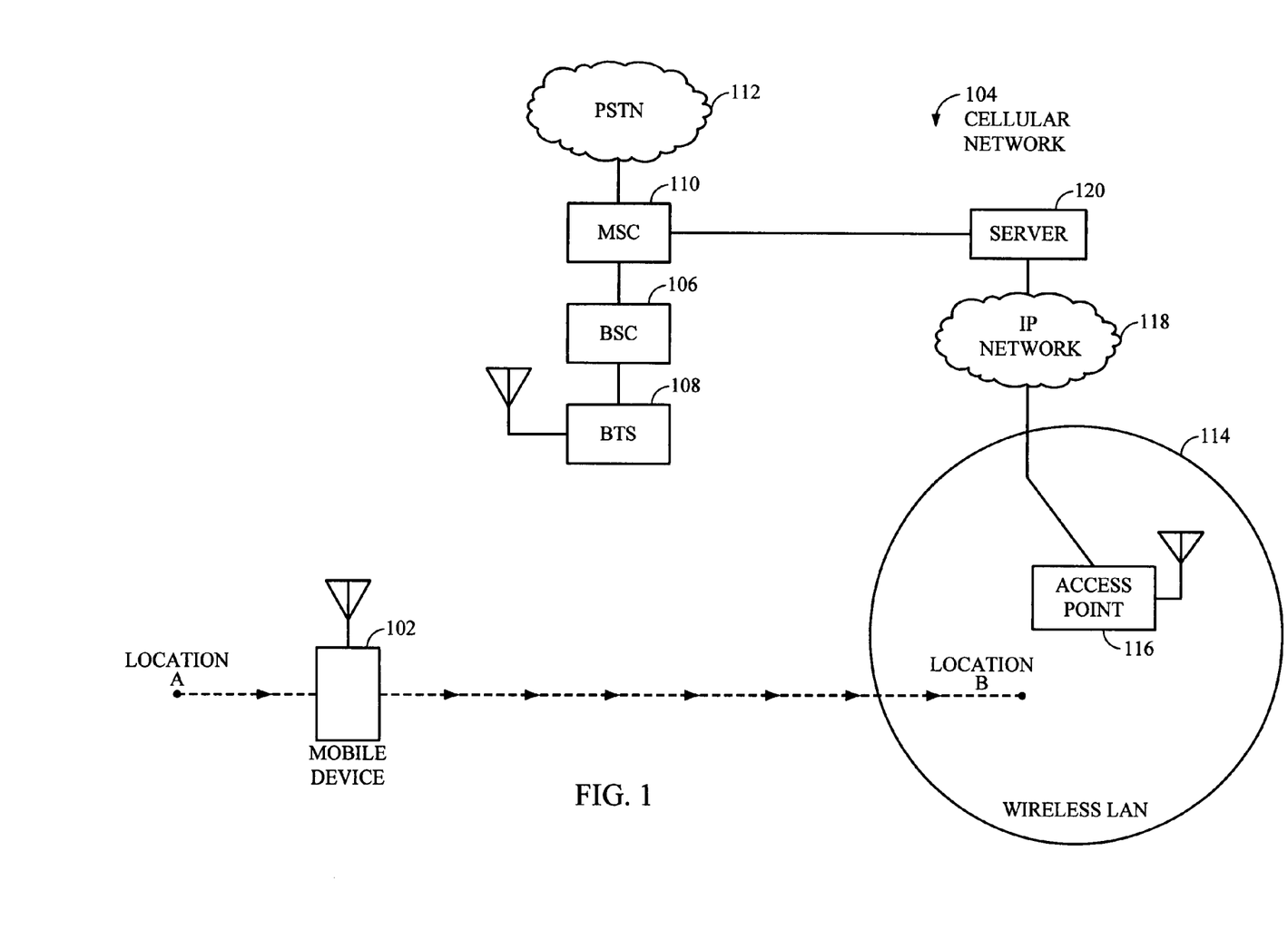
FIG. 1 is a conceptual block diagram of an embodiment of a wireless communications system.

FIG. 1 is a conceptual block diagram of an embodiment of a wireless communications system. A mobile device 102 is shown moving through a wide area cellular network 104 by a series of broken lines. The cellular network 104 includes a BSC 106 supporting a number of BTSs dispersed throughout the cellular coverage region. A single BTS 108 is shown in FIG. 1 for simplicity of explanation. A mobile switching center (MSC) 110 may be used to provide a gateway to a public switched telephone network (PSTN) 112. Although not shown in FIG. 1, the cellular network 104 may employ numerous BSCs each supporting any number of BTSs to extend the geographic reach of the cellular network 104. When multiple BSCs are employed throughout the cellular network 104, the MSC 110 may also be used to coordinate communications between the BSCs.

The mobile device 102 is initially shown in location A in FIG. 1. As the mobile device 102 moves through the cellular network 104 from location A to location B, it comes within the coverage region of a wireless LAN 114. The wireless LAN 114 may be an IEEE 802.11 network, or any other suitable network. The wireless LAN 114 includes an access point 116 for the mobile device 102 to communicate with an IP network 118. A server 120 may be used to interface the IP network 118 to the MSC 110, which provides a gateway to the PSTN 112.

When power is initially applied to the mobile device 102, it registers with either the cellular network 104 or the wireless LAN 114. "Registration" refers to a process whereby the mobile device 102 tells the MSC 110 to route calls from the PSTN 112 through a particular network. The decision to register with a particular network may vary depending on the specific application and overall design constraints. By way of example, the mobile device 102 may be configured to register with the wireless LAN 114 if the service quality is acceptable. By routing all calls to the mobile device 102 through the wireless LAN 114, valuable cellular bandwidth may be freed up for other mobile users.

As the mobile device 102 moves through the cellular network 104 from location A to location B in the depicted embodiment, it begins to detect a beacon from the access point 116. Once the mobile device 102 detects the beacon, a radio connection may be established between the two by means well known in the art. The mobile device 102 then obtains the IP address of the server 120. The mobile device 102 may use the services of a Domain Name Server (DNS) to determine the server's IP address. The domain name of the server 120 may be delivered to the mobile device 120 over the cellular network 104. With the IP address, the mobile device 102 can establish a network connection with the server 120. Once the network connection is established, information from the server 120 can be used in conjunction with local measurements to determine whether to update its registration with the MSC 110 so that future calls are routed through the wireless LAN 114.

Figure 2:
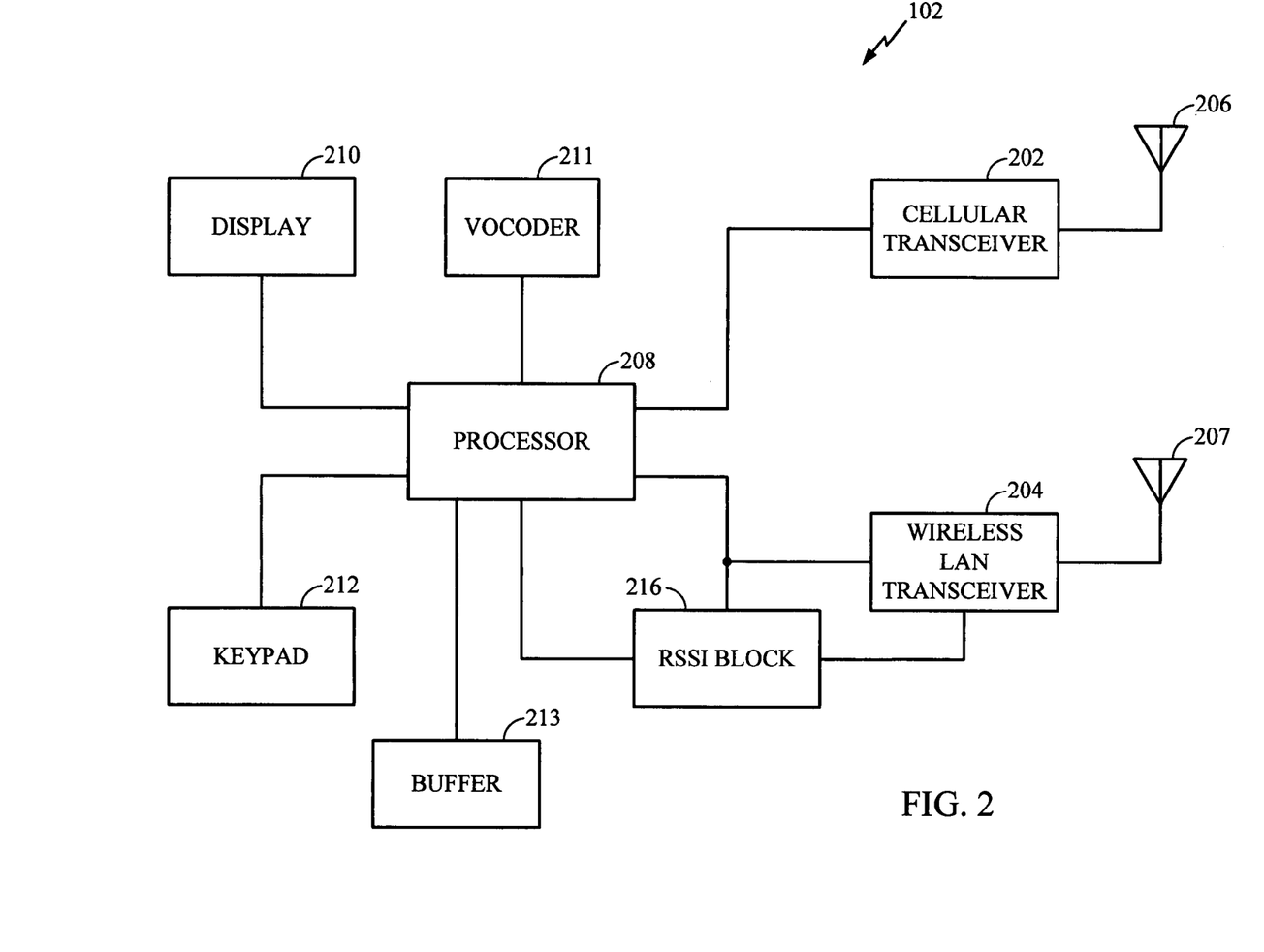
FIG. 2 is a functional block diagram illustrating an example of a mobile device capable of supporting both cellular and wireless LAN communications.

FIG. 2 is a functional block diagram illustrating an example of a mobile device capable of supporting both cellular and wireless LAN communications. The mobile device 102 may include a cellular transceiver 202 and a wireless LAN transceiver 204. In at least one embodiment of the mobile device 102, the cellular transceiver 202 is capable of supporting CDMA2000 1x communications with a BTS (not shown), and the wireless LAN transceiver 204 is capable of supporting IEEE 802.11 communications with an access point (not shown). Those skilled in the art will readily appreciate, however, that the concepts described in connection with the mobile device 102 can be extended to other cellular or wireless LAN technologies. Each transceiver 202, 204 is shown with a separate antenna 206, 207, respectively, but the transceivers 202, 204 could share a single broadband antenna. Each antenna 206, 207 may include one or more radiating elements.

The mobile device 102 is also shown with a processor 208 coupled to both the cellular transceiver 202 and the wireless LAN transceiver 204, however, separate processors may be used for each transceiver in alternative embodiments of the mobile device 102. The processor 208 may be implemented as hardware, firmware, software, or any combination thereof. By way of example, the processor 208 may include a microprocessor (not shown). The microprocessor may be used to support software applications that, among other things, (1) control and manage access to the cellular network and wireless LAN, and (2) interface the processor 208 to the keypad 210, display, 212, and other user interfaces (not shown). The processor 208 may also include a digital signal processor (DSP) (not shown) with an embedded software layer that supports various signal processing functions, such as convolutional encoding, modulation and spread-spectrum processing. The DSP may also implement a vocoder 211 to provide functions to support telephony applications. The manner in which the processor 208 is implemented will depend on the particular application and the design constraints imposed on the overall system. Those skilled in the art will recognize the interchangeability of hardware, firmware, and software configurations under these circumstances, and how best to implement the described functionality for each particular application.

The processor 208 may be configured to execute a media access algorithm that is used to determine when the mobile device 102 should transmit VoIP packets to the access point 116. This algorithm may be implemented as one or more software applications supported by the microprocessor based architecture discussed earlier. Alternatively, this algorithm may be a separate module from the processor 208 implemented in hardware, software, firmware, or any combination thereof. Depending on the specific design constraints, the media access algorithm could be integrated in any entity in the mobile device 102, or distributed across multiple entities in the mobile device 102.

Figure 3:
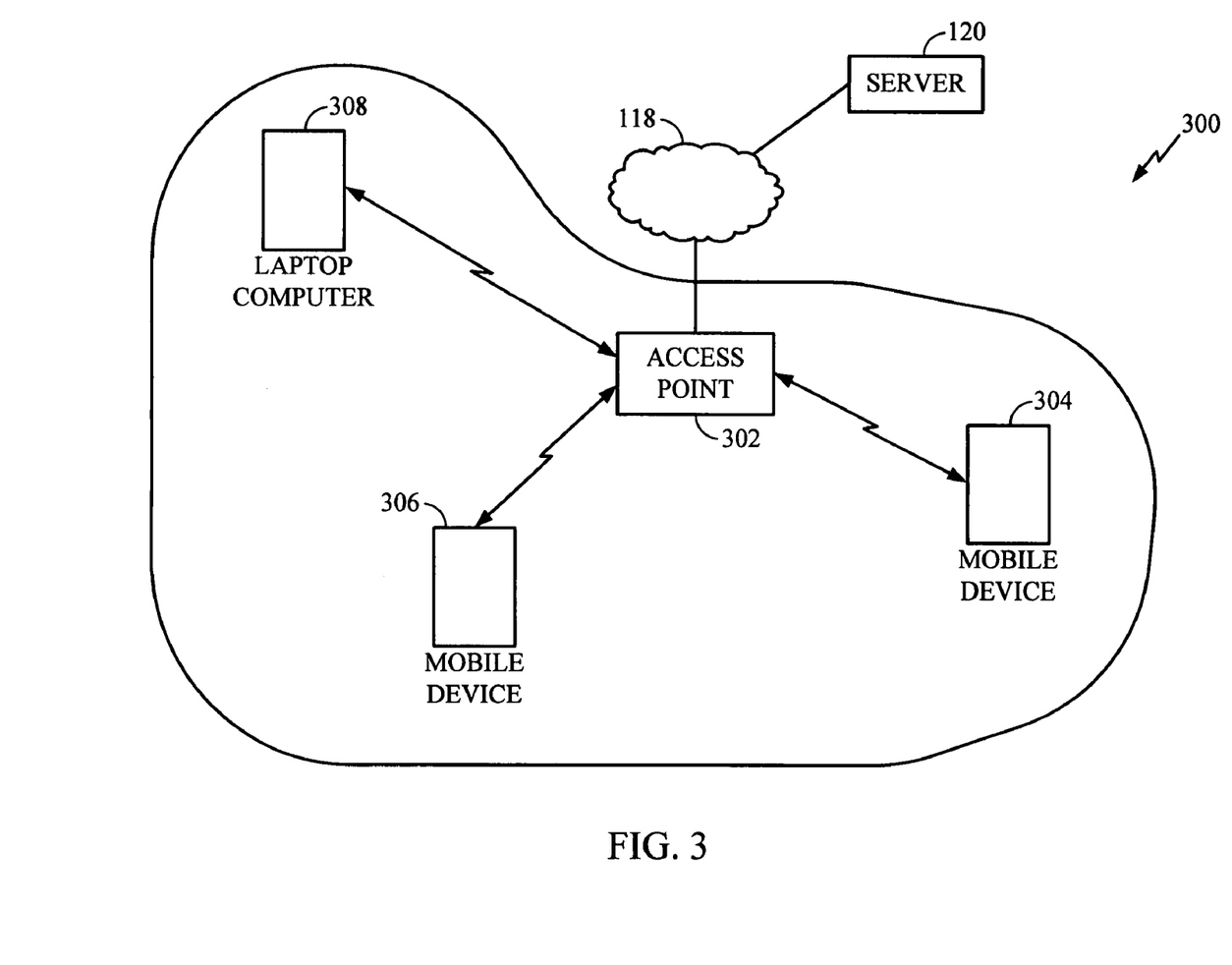
FIG. 3 is a conceptual block diagram of a wireless communications system having multiple mobile devices.

FIG. 3 depicts a wireless LAN 300 with an access point 302 that is similar to that of access point 116 of FIG. 1. Furthermore, the access point 302 includes a connection to the server 120 through the IP network 118. Although not explicitly depicted in FIG. 3, the server 120 is in communication with the MSC 110 as shown in FIG. 1. FIG. 3 is provided as an example of a wireless LAN 300 that has multiple devices associated therewith. For example, a portable computer 308 and two mobile devices 304, 306 are shown as being associated with the access point 302. In particular, the mobile device 304, 306 may be substantially similar to the mobile device 102 described earlier with reference to FIGS. 1 and 2.

One exemplary type of wireless LAN may be provided by an access point 302 that conforms to an 802.11 standard. As is known to one of ordinary skill, the devices 304, 306 and 308 communicate by exchanging packets over the air with the access point 302 according to the standardized protocol. The transmission of packets is not coordinated among the different devices 304, 306, 308 or controlled by the access point 302. Instead, any device is free to broadcast at any time they have data available. Furthermore, the 802.11 standard, as well as many other standards allowing random access to the broadcast medium (i.e., a random access network), provides a mechanism to detect collisions that permits devices to retransmit packets that may have collided. As used herein, a "collision" may include the occurrence of any phenomenon on the broadcast media that prevents a packet from being accurately received at an intended destination. Typically, a collision occurs when a device attempts to broadcast a packet during the same time that another device is broadcasting a packet.

With only a few devices 304, 306, 308 using the access point 302, the likelihood of a collision occurring is small enough that users usually cannot detect any impact on performance. However, as more devices are associated with the wireless LAN 300, the likelihood of collisions increase and performance effects can become noticeable. Additionally, some applications are more sensitive to any delays that are caused by collisions. For example, users who are utilizing the wireless LAN 300 for VoIP applications will notice delays in the voice transmissions much more easily than users who are utilizing typical data applications.

In addition to some applications, such as VoIP, being more sensitive to delays, the algorithms for handling collisions can, themselves, contribute to the performance degradation caused by collisions for all applications. Many wireless LAN standards employ random back-off algorithms which prevent a device from re-transmitting a packet until a random time period has expired. If a collision occurs again, then the maximum value for this random time period is lengthened. Thus, as more devices cause more collisions, the random back-off periods can grow in length and thereby, cause additional delays in transmitting packets in a crowded wireless LAN. Furthermore, the only indication that a collision occurred is typically the absence of receiving an ACK packet. Thus, devices must wait for the time-out period of receiving the ACK packet before knowing that a collision occurred and that a re-transmission is needed.

Figure 4:
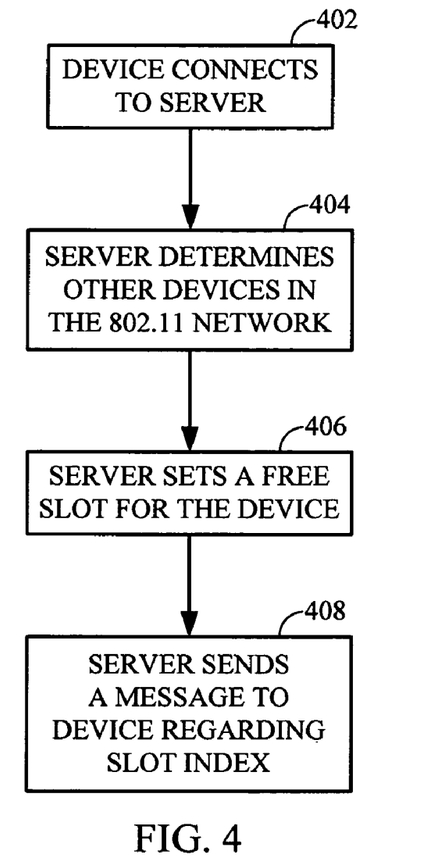
FIG. 4 is a flow diagram illustrating the functionality of assigning a slot index to a mobile device in accordance with the principles of the present invention.
Figure 5:
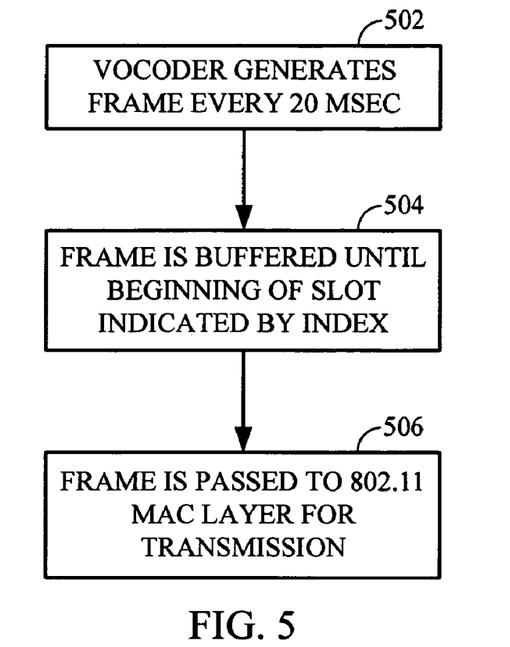
FIG. 5 is a flow diagram illustrating the functionality of transmitting a packet from a mobile device at a time based on an assigned slot index.

FIGS. 4 and 5 depict an algorithmic approach to decreasing the collision probability for transmitted packets that may, for example, be VoIP packets. This particular algorithmic approach is described herein with reference to a CDMA and wireless LAN device similar to that of FIG. 2. However, it may be appreciated that utilization of other telecommunications technologies is also contemplated within the scope of the present invention.

Typically, within a VoIP application, a vocoder 211 generates a voice packet at fixed intervals. For example, in the example described below, the vocoder generates a voice packet every 20 msecs. Once this packet is generated, it is passed through the MAC layer onto the PHY layer as commonly known in the art. If two or more VoIP devices are producing voice packets at substantially the same rate (e.g., every 20 msecs) and they happen to be doing so within a closely spaced interval, then there is a likelihood that their respective voice packets will collide. Furthermore, because they will continue to generate voice packets at the same rate, their subsequent voice packets will likely collide as well. The flowchart of FIG. 4 illustrates an exemplary algorithm for reducing the likelihood of collision between voice packets by coordinated the transmission of the packets from the different devices. In the present description a vocoder and voice packets are described merely by way of example and one of ordinary skill will recognize that other data generators that generate data units or packets at a fixed period are also contemplated.

In step 402, a mobile device (e.g., 304) connects, or registers, with the server 120 as explained earlier with respect to FIG. 1. Part of this registration process involves identifying the wireless LAN 300. From the identification of the wireless LAN 300, the server determines, in step 404, other VoIP devices (e.g., 306) on that same wireless LAN 300.

In addition to the server 120 maintaining a list of the devices on the wireless LAN 300, the server also maintains a respective slot index value that is associated with each of the devices. Based on this slot index information, the server 120, in step 406, identifies a free slot and assigns it to the device being registered. A "slot" refers to a portion of a time period in which a voice packet may be transmitted. For example, in the earlier described vocoder, there is a 20 msec interval between transmission of voice packets. This time interval may be used to transmit the voice packet before another voice packet is generated. Because successful transmission of a voice packet may only require 1 msec or less, multiple voice packets may be transmitted from different devices in a non-overlapping manner during that 20 msecs. If the 20 msec interval is broken into 16 slots for example, then 16 different 1.25 ms windows are available for transmitting a voice packet during each interval. A "slot index" simply identifies one of the possible 16 slots. One of ordinary skill will recognize that the 20 msec value, the 1 msec value, and the value of 16 slots are merely provided by way of example and that these particular values may be modified in a variety of different ways to define time intervals, different numbers of slots and different slot lengths during which a voice packet may be transmitted by different devices. Furthermore, the packet being transmitted does not necessarily have to be a voice packet. Transmission of regularly occurring data packets in other applications, especially those that would suffer from packet delay, will also benefit from the techniques described herein.

In step 408, the server 120 returns a message to the device that identifies the device's assigned slot index. The information returned by the server 120 may identify the slot index simply as a value (e.g., "5") or in a manner such as "5 of 20". This latter method informs the device not only of its slot index but also the maximum number of slots. In this way, the number of slots, and therefore the slot duration, may be variable depending on the information returned to the device. FIG. 5 depicts a flowchart of an algorithm by which devices may use the slot index information to reduce the probability of collision between voice packets.

In step 502, the vocoder generates a voice packet every 20 msec. As described earlier, this time interval is typically a function of the vocoder 211 and may vary. Instead of immediately passing the voice packet to the wireless LAN MAC layer for transmission, the device stores, in step 504, the voice packet in a buffer 213. The device then measures time from when the voice packet is generated. When the time for the slot arrives that has been assigned to the device, the buffered voice packet is passed, in step 506, to the 802.11 MAC layer for transmission.

Coordinating the transmission of voice packets in this manner effectively reduces the probability of collision between packets sent by different devices. The timekeeping that takes place within the device to determine when their assigned slot is occurring may be accomplished by a number of different methods. For example, the different devices (e.g. 304, 306) may utilize available CDMA signals to synchronize to a common clock so that the 20 msec intervals occur substantially at the same time for each device. If the 20 msec (or some other length) intervals occur at different times for different devices, then the CDMA signals may still be used to extract enough information for a device to determine the start of their interval and, thereby, determine when each slot in that interval starts. Alternatively, an IP-based protocol such as the network time protocol (NTP) may be available through the wireless LAN to provide time synchronization information for the different devices. Other alternative methods are also contemplated that allow a device to determine, based on an assigned slot index, when in each regularly occurring interval to transmit a voice, or other, packet.

A number of variations to the specific behaviors and steps described in the above examples may be made without departing from the scope of the present invention. For example, as described, the server determines an unassigned slot index to assign to a new device being registered. There may be some instances, however, in which there are more devices than slots; in such cases, the slots indices may be distributed so that as few devices as possible share any particular slot index. Additionally, the access point 302, instead of the server 120, may assign the slot index to each device. The assignment of a slot index may alternatively occur in a random fashion or be based on some data point that varies among devices such as, for example, the time of day when a device registers or the last byte of the device's MAC address. In addition to VoIP traffic, other regularly occurring packet transmissions may be synchronized in a manner similar to that described herein in order to reduce the probability of packet collisions. The term "packet" has an accepted meaning within networks known as packet network; however, as used herein the term "packet" may refer to any discrete data unit that is assembled for transmission via a network.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile communications device for reducing packet collision in a random access wireless communication network the mobile communication device capable of supporting communications in both a cellular network and the random access wireless communication network during a call session, comprising:

a processor configured to establish a connection with a server in the random access wireless communication network, and configured to update a registration with the cellular network to route the call session through the random access wireless communication network based on information from the server;
a data generator under the control of the processor and configured to generate a data unit during the call session, the data unit generated at a rate having a fixed period, wherein the time required to transmit the data unit is shorter than the total fixed period; and
a transceiver under control of the processor, wherein the transceiver receives a message that identifies the mobile communications device's assigned slot index, wherein the message also informs the device of the maximum number of slots, and configured to transmit the data unit to the server during a particular time slot, wherein the particular time slot is based upon the slot index assigned to the mobile communications device by the server, wherein the slot index identifies at least one of a plurality of transmission periods during which the data unit is to be transmitted.

2. The mobile communications device of claim 1, wherein the particular slot is one of a plurality of adjacent slots.

3. The mobile communications device of claim 2, wherein the plurality of slots are equal in size.

4. The mobile communications device of claim 2, wherein the plurality of slots, in aggregate are substantially equal to the fixed period.

5. The mobile communications device of claim 2, wherein each of the plurality of slots is of sufficient length to permit the data unit to be transmitted before a beginning of an adjacent slot.

6. The mobile communications device of claim 1, wherein the data unit comprises a voice over IP packet.

7. The mobile communications device of claim 1, wherein the random access wireless communication network comprises a wireless LAN.

8. A mobile communications device for reducing packet collision in a random access wireless communication network, the mobile communication device capable of supporting communications in both a cellular network and the random access wireless communication network during a call session, comprising:
a processor configured to establish a connection with a server in the random access wireless communication network, and configured to update a registration with the cellular network to route the call session through the random access wireless communication network based on information from the server;
a vocoder controlled by the processor and configured to generate a voice packet, the vocoder configured to generate voice packets at a rate having a fixed period, wherein the time required to transmit the voice packet is shorter than the total fixed period;
the processor further configured to buffer the voice packet until a transmit time; and
a transceiver, in communication with the buffer and controlled by the processor, wherein the transceiver receives a message that identifies the mobile communications device's assigned slot index, wherein the message also informs the device of the maximum number of slots, said transceiver configured to transmit the voice packet at the transmit time, wherein the transmit time corresponds to a particular time slot based upon the slot index assigned by the server, wherein the slot index identifies at least one of a plurality of transmission periods within the fixed period and indicates when the data unit is to be transmitted.

9. The mobile communications device of claim 8, wherein the particular slot is one of a plurality of slots.

10. The mobile communications device of claim 9, wherein each of the plurality of slots is of sufficient length to permit the voice packet to be transmitted before a beginning of an adjacent slot.

11. The mobile communications device of claim 8, wherein the random access wireless communication network comprises at least a wireless LAN.

12. A mobile communications device for reducing packet collision in a random access wireless communication network, the mobile communication device capable of supporting communications in both a cellular network and the random access wireless communication network during a call session, comprising:
a processor configured to establish a connection with a server in the random access wireless communication network, and configured to update a registration with the cellular network to route the call session through the random access wireless communication network based on information from the server, wherein the processor receives a message that identifies the mobile communications device's assigned slot index, wherein the message also informs the device of the maximum number of slots, the processor being further configured to generate a data unit, the processor configured to generate ones of the data unit at a substantially fixed period the processor further configured to identify a particular transmission slot in the fixed period, wherein the time required to transmit the data unit is shorter than the total fixed period; and
a transceiver configured to transmit, to the server, the data unit during the particular transmission slot, wherein the particular transmission slot is based upon the slot index assigned by the server, wherein the slot index identifies at least one of a plurality of transmission periods.

13. The mobile communications device of claim 12, wherein the network comprises at least a wireless LAN connection.

14. A mobile communications device for reducing packet collision in a random access wireless communication network, the mobile communication device capable of supporting communications in both a cellular network and the random access wireless communication network during a call session, comprising:
means for establishing a network connection with a server over the random access wireless communication network, updating a registration with the cellular network to route the call session through the random access wireless communication network based on information from the server, wherein the information from the server comprises a message that identifies the mobile communications device's assigned slot index, wherein the message also informs the device of the maximum number of slots, and generating a data unit, ones of the data unit generated at a rate having a fixed period, wherein the time required to transmit the data unit is shorter than the total fixed period; and
means for transmitting the data unit during a particular transmission slot, based upon the slot index assigned by the server, wherein the slot index identifies at least one of a plurality of transmission periods within the fixed period and indicates when the data unit is to be transmitted within the fixed period.

15. A method for reducing packet collision in a random access wireless communication network, a mobile communication device capable of supporting communications in both a cellular network and the random access wireless communication network during a call session, the method comprising:

establishing a network connection with a server over the random access wireless communication network and updating a registration with the cellular network to route the call session through the random access wireless communication network based on information from the server;

receiving a message from the server that identifies the mobile communications device's assigned slot index, wherein the message also informs the device of the maximum number of slots;

periodically generating a data unit at a fixed time interval, wherein the time required to transmit the data unit is shorter than the fixed time interval; and     transmitting the data unit on at least one of a plurality of transmission slots within the fixed period, the at least one of the plurality of transmission slots specified by the slot index assigned by the server, wherein the slot index identifies at least one of a plurality of transmission periods within the fixed period and indicates when the data unit is to be transmitted.

16. The method of claim 15, wherein the plurality of transmission slots are equal in size.

17. The method of claim 15, wherein the plurality of transmission slots, in aggregate are substantially equal to the fixed period.

18. The method of claim 15, wherein the data unit comprises a voice over IP (VoIP) packet.

19. The method of claim 15, wherein the random access wireless communication network comprises a wireless LAN.

20. An integrated circuit comprising storage memory having software instructions stored thereon, the software instructions being executable by a processor for reducing packet collisions in a random access wireless communication network, a mobile communication device capable of supporting communications in both a cellular network and the random access wireless communication network during a call session, the software instructions comprising:

instructions for establishing a network connection with a server associated with the random access wireless communication network and updating a registration with the cellular network to route the call session through the random access wireless communication network based on information from the server, for receiving a message from the server that identifies the mobile communications device's assigned slot index, wherein the message also informs the device of the maximum number of slots, and periodically generating a plurality of data units at a rate having a fixed period, wherein the time required to transmit one of the plurality of data units is shorter than the fixed period; and     instructions for transmitting the data unit during a particular transmission slot based upon the slot index assigned by the server, wherein the slot index identifies at least one of a transmission periods within the fixed period and indicates when the data unit is to be transmitted within the fixed period in order to transmit the periodical data units with fixed periods in the wireless communication network at potentially different times.

\* \* \* \* \*